United States Patent [19]

Corrette

[11] Patent Number: 4,573,376
[45] Date of Patent: Mar. 4, 1986

[54] METHOD OF PRODUCING THREAD ROLLING DIE

[75] Inventor: Richard H. Corrette, North Ridgeville, Ohio

[73] Assignee: Colt Industries Operating Corp., Cleveland, Ohio

[21] Appl. No.: 558,946

[22] Filed: Dec. 7, 1983

Related U.S. Application Data

[63] Continuation-in-part of Ser. No. 366,979, Apr. 9, 1982, abandoned.

[51] Int. Cl.[4] ............................................. B21K 5/20
[52] U.S. Cl. ................................... 76/107 R; 409/66
[58] Field of Search ............. 76/101 B, 107 R; 72/88; 409/66, 71, 75

[56] References Cited

U.S. PATENT DOCUMENTS

| | | | |
|---|---|---|---|
| 3,176,491 | 4/1965 | Mau et al. | 72/88 |
| 3,217,530 | 11/1965 | Sato | 72/88 |
| 3,405,545 | 10/1968 | Orlomoski | 72/88 |
| 3,930,425 | 1/1976 | Orlomoski | 76/107 R |

*Primary Examiner*—Roscoe V. Parker
*Attorney, Agent, or Firm*—Pearne, Gordon, Sessions, McCoy, Granger & Tilberry

[57] ABSTRACT

Thread rolling dies for pointed fasteners having an improved working face contour which promotes displacement of blank material from the blank point area at an early stage in the thread rolling sequence to avoid excessive pressures in the die and blank at the finishing stages of the rolling sequence. Thread cutters include an extended section that presurfaces the rise angle of the die working face to produce uniform, improved thread profiles.

13 Claims, 13 Drawing Figures

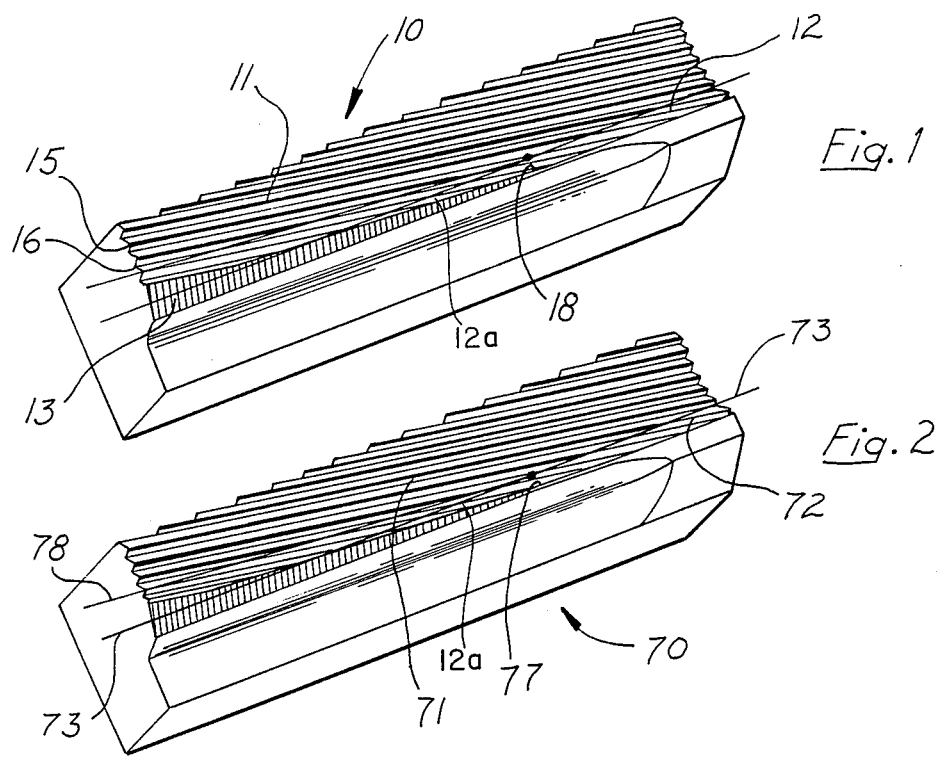
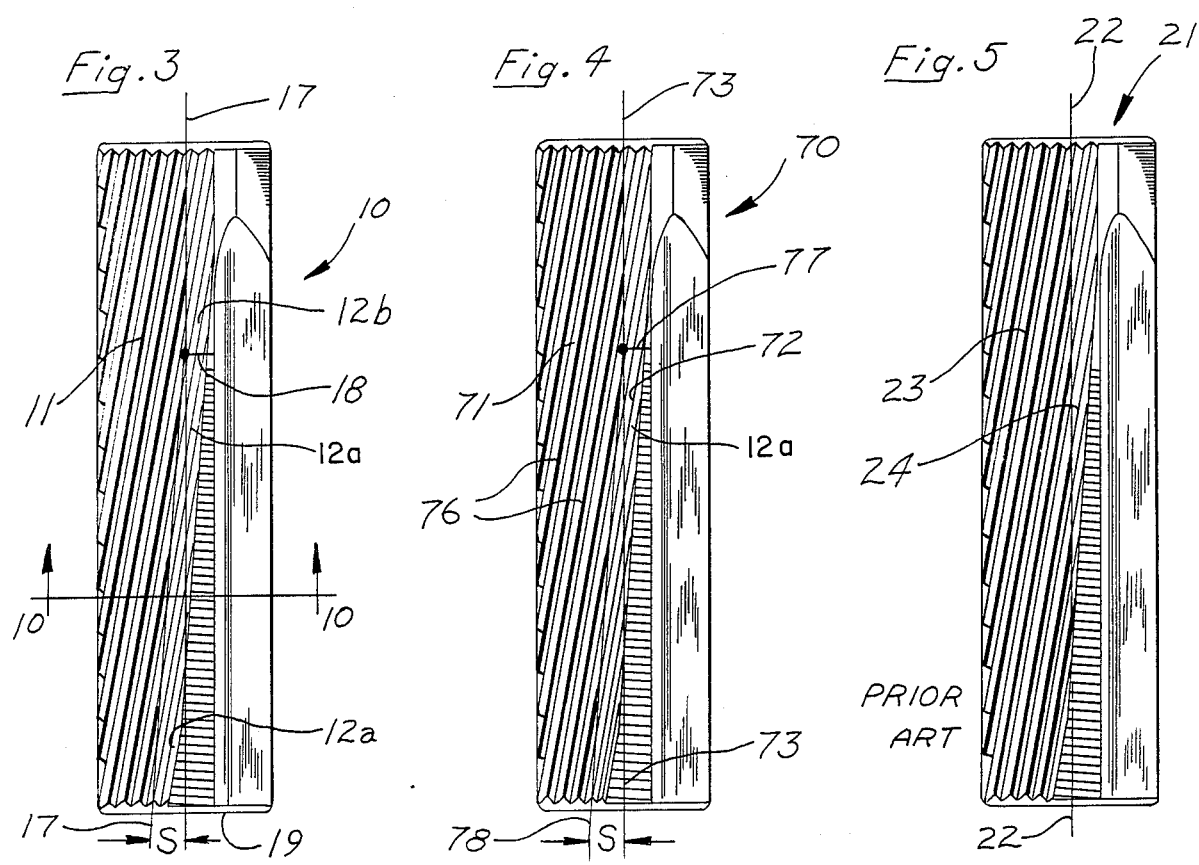

METHOD OF PRODUCING THREAD ROLLING DIE

This is a continuation-in-part of my copending application Ser. No. 366,979, filed Apr. 9, 1982 now abandoned.

BACKGROUND OF THE INVENTION

The invention relates to thread rolling dies and, more particularly to improvements in dies and methods of their manufacture for making threaded, pointed fasteners.

PRIOR ART

A style of threaded fastener product sometimes referred to in the industry as a CA type comprises, in addition to the usual head portion at one end, a threaded cylindrical body portion and a point portion which is also threaded at the end opposite the head. The point portion is ordinarily conical, which term, hereinafter, means conical or frustoconical. Such fasteners and similar styles are commonly formed by rolling a headed cylindrical blank between an opposed set of thread rolling dies. The dies can be "selfpointing" so as to automatically roll-form a threaded point on the blank simultaneously with the threading operation on the main body of the blank. During such point forming operation, a slug of excess material is cut off by the dies.

The transition area between the point portion and cylindrical portion, as well as the point portion itself in both the product and the dies, are troublesome because of the high degree of working or deformation which is imposed on the blank in these areas. High working pressures in these areas may result in premature failure of the dies, particularly where the die threads in these areas are imperfectly formed. Further, it is sometimes difficult to overcome the tendency for excess blank material to be trapped in these areas, with the result that oversize, out-of-tolerance parts are produced. The difficulties outlined above can be compounded by the procedures currently practiced in manufacturing dies of the general type under consideration. One presently used manufacturing sequence involves the formation of a die preform by milling or other suitable fabricating techniques. The preform, which ordinarily includes a rise angle surface and which may be relatively coarsely formed in a dimensional sense, is made on a machine separate from the machine which ultimately forms the threads on the die. This sequence introduces potential dimensional and geometrical errors from both machines as well as errors in the positioning of the die preform on the die thread forming machine. These dimensional errors are most troublesome in the location or, more accurately, the deviation of the coarse preform rise angle surface from its ideal position when fixtured in the die thread forming machine. Since the rise angle is an inclined plane, it is difficult to compensate or adjust for its improper location by simple horizontal adjustments on the bed of the die thread forming machine. In prior methods of facing the rise angle with threads, deviations of the coarse die preform surface could result in undersize and/or oversize thread forms. As can be understood from the above discussion of the severe service conditions in the point-forming portion and adjacent transition portions of the die, any imperfect thread profiles in these portions can aggravate an already highly stressed area.

SUMMARY OF THE INVENTION

The invention provides, in one aspect, an improved working surface contour in a thread rolling die that increases the quality and uniformity of pointed, threaded product made by the die and improves the potential durability of the die itself. The die working face contour is characterized by a zone which advances the displacement of excess material in the blank towards the slug end early in the thread rolling sequence. Primarily only finish shaping of the threaded part need be accomplished later in the thread rolling sequence. As a result, forces in the die and threaded part are decreased, blank material being shaped is more easily managed, out-of-tolerance parts are more readily avoided, and die life is generally extended.

One disclosed arrangement for contouring the working face of the die to produce early displacement of blank material from the point to the slug involves a shift of the forward end of the rise angle surface into the rolling path of the blank. Thread grooves are cut generally with a uniform depth across the working face of the die. The presence of the forward end of the rise angle surface displaces material into the slug of the blank early in the thread rolling sequence when the cut-off edges of opposed dies have not yet significantly pinched off passage of such material into the slug receiving area of the dies.

The second disclosed arrangement for contouring the die-working face involves the programming of the groove forming tool such that it forms relatively shallow grooves at the forward end of the die G-plane adjacent the heel line as well as the forward area of the rise angle plane. These shallow grooves have the effect of advancing displacement of blank material into the slug in a manner analagous to that described above in connection with an actual shift of the rise angle surface.

Another aspect of the invention involves a technique in machining the face of a thread rolling die for pointed, threaded parts in which substantially the entire working surface is cut by the thread cutter. This technique results in a very accurately formed die with close control of the size, shape, and fullness of the thread profiles. As disclosed, the die machining method relies on a cutter having an extended length to provide a lead or preliminary cutting section extending axially from the more conventional thread shaping profile of the cutter. Ideally, the preliminary cutting section extends a distance approximating the die thread spacing. The preliminary cutting section advantageously shapes the area of a future thread on the die preform on each pass of the cutter. In a succeeding pass, the cutter forms a thread on the area previously shaped by the preliminary cutting section. In this manner, the position of a shaped rise angle surface as it is subsequently encountered by the thread profile cutting surfaces of the cutter is precisely controlled. The result is that the thread profile cutting surfaces of the cutter need not remove excessive amounts of material from the die preform and, on the other hand, thread profiles on the rise angle will be completely filled out. Close control of the die thread profile in the area of the rise angle is especially important in the manufacture of high quality, long-life die sets.

The extended length die thread cutter is particularly suited for fabricating the disclosed die having a shifted rise angle plane. As is customary, a die preform is rough machined or otherwise fabricated with surfaces corresponding to, but somewhat outward of, the G-plane and the rise angle plane. Where the forward end of the rise angle plane is shifted, the rise angle surface exists in two planes intersecting at a "heel." The extended length cutter conveniently and efficiently removes material from the die preform to form the heel hollow. Consequently, the rough fabrication of the die preform is free of this surface complexity.

BRIEF DESCRIPTION OF THE DRAWINGS

FIG. 1 is a perspective view of one embodiment of a self-pointing, thread rolling die constructed in accordance with the invention;

FIG. 2 is a perspective view of a second embodiment of a self-pointing, thread rolling die constructed in accordance with the invention;

FIG. 3 is a plan view of the die of FIG. 1;

FIG. 4 is a plan view of the die of FIG. 2;

FIG. 5 is a plan view of a die illustrating a conventional prior art construction;

DESCRIPTION OF THE PREFERRED EMBODIMENTS

Figure 6:
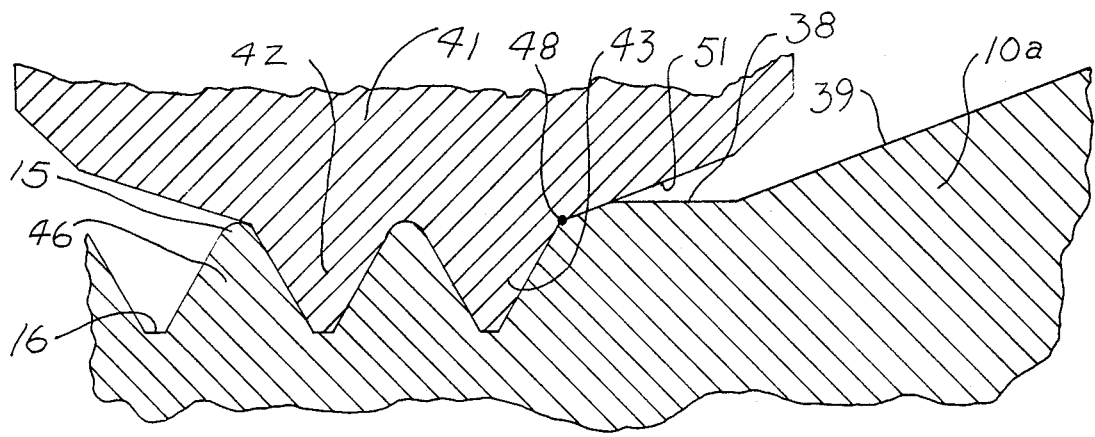
FIGS. 6–8 are sequential, schematic views of a die preform being formed with threads by a method of die manufacture in accordance with the invention.

Referring now to FIGS. 1 and 3, there is illustrated a self-pointing thread rolling die 10 constructed in accordance with the invention. The die 10 is used to roll-form threads on a blank to produce a threaded part, such as a headed screw, bolt, or like fastener. The part produced by the die 10 is characterized by a generally cylindrical main body portion and a conical end or point. As will be more clearly understood from the following disclosure, both the cylindrical main body and point are formed with external threads. In the industry, one type of such fastener is known as a CA type.

The die 10 is fabricated from air hardening tool steel or other suitable material. The working face of the die includes a generally planar G-plane surface 11, a rise angle surface 12, and a cut-off angle 13. The G-plane and rise angle surfaces 11, 12, as discussed in greater detail below, have ridges 15 and intervening grooves 16 formed substantially throughout their respective areas. The grooves 16 on these respective surfaces, for the most part, are of uniform depth. The ridges 15, or, more properly, the crest of the ridges of the G-plane area, lie substantially in a common plane which in FIG. 3 is parallel to the plane of the drawing. The ridges 15 of the rise angle surface 12 lie in substantially two planes 12a, 12b, which intersect the G-plane 11 along a heel line 17 and which intersect each other at a line 18, where the heel line 17 is slightly folded.

Study of the folded heel line 17 in FIG. 3 reveals that adjacent a forward end 19 of the die 10 the forward rise angle plane 12a has been shifted to the left a distance from where it would be if it were coplanar to (i.e., an extension of) the rearward rise angle plane 12b. The shift of forward rise angle plane 12a at the forward end 19 of the die is indicated at "S" which is the distance between the front portion of the heel line 17 and an imaginary extension of the rear portion of the heel line. The distance "S" is preferably in the order of one-half to one thread pitch, but may be in the range of between one-half and three pitches approximately. It will be understood that the forward and rearward rise angle planes 12a, 12b are inclined with respect to the G-plane 11 by essentially the same angle, which normally is in the range of approximately 15° to 25°, and is directly related to the cone angle of the point of the threaded part that it forms.

For purposes of comparison and understanding of the invention, there is shown in FIG. 5 a schematic representation of a prior art die 21. Inspection of FIG. 5 reveals that a heel line 22 between a G-plane 23 and a single rise angle plane 24 is straight along the length of the die and, as will be understood by those who are familiar with the art, is parallel to the rolling direction of a blank.

For the sake of simplicity, the dies illustrated in FIGS. 1 through 5 are intended to represent the important features of both the long and the short dies of a set. The inventive concepts disclosed herein are compatible with the presence of tapered roll-on and roll-off areas in a short die, for example. As is the case with conventional die sets, the die 10 cooperates with a substantially identical, opposed, spaced die to roll threads on cylindrical blanks in a generally known manner.

Figure 10:
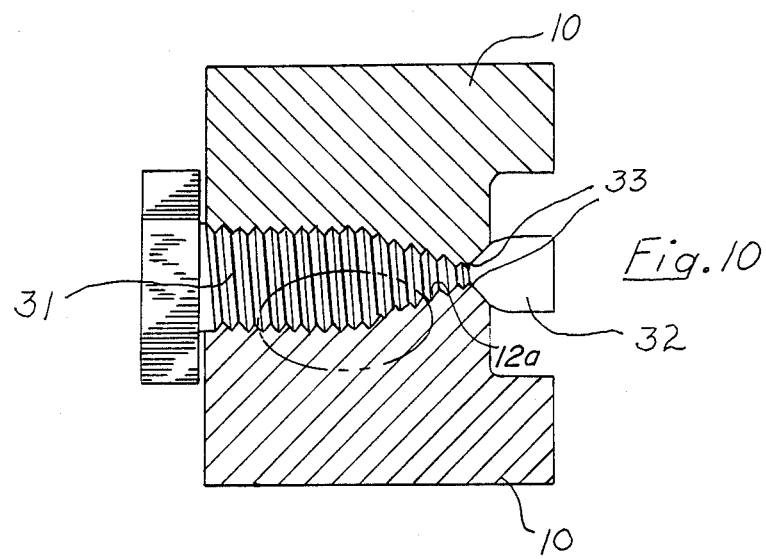
FIG. 10 is an enlarged, cross-sectional view of a pair of opposed cooperating dies engaged with a blank in an intermediate stage in a thread rolling process generally corresponding to the position indicated at the line 10—10 in FIG. 3.
Figure 11:
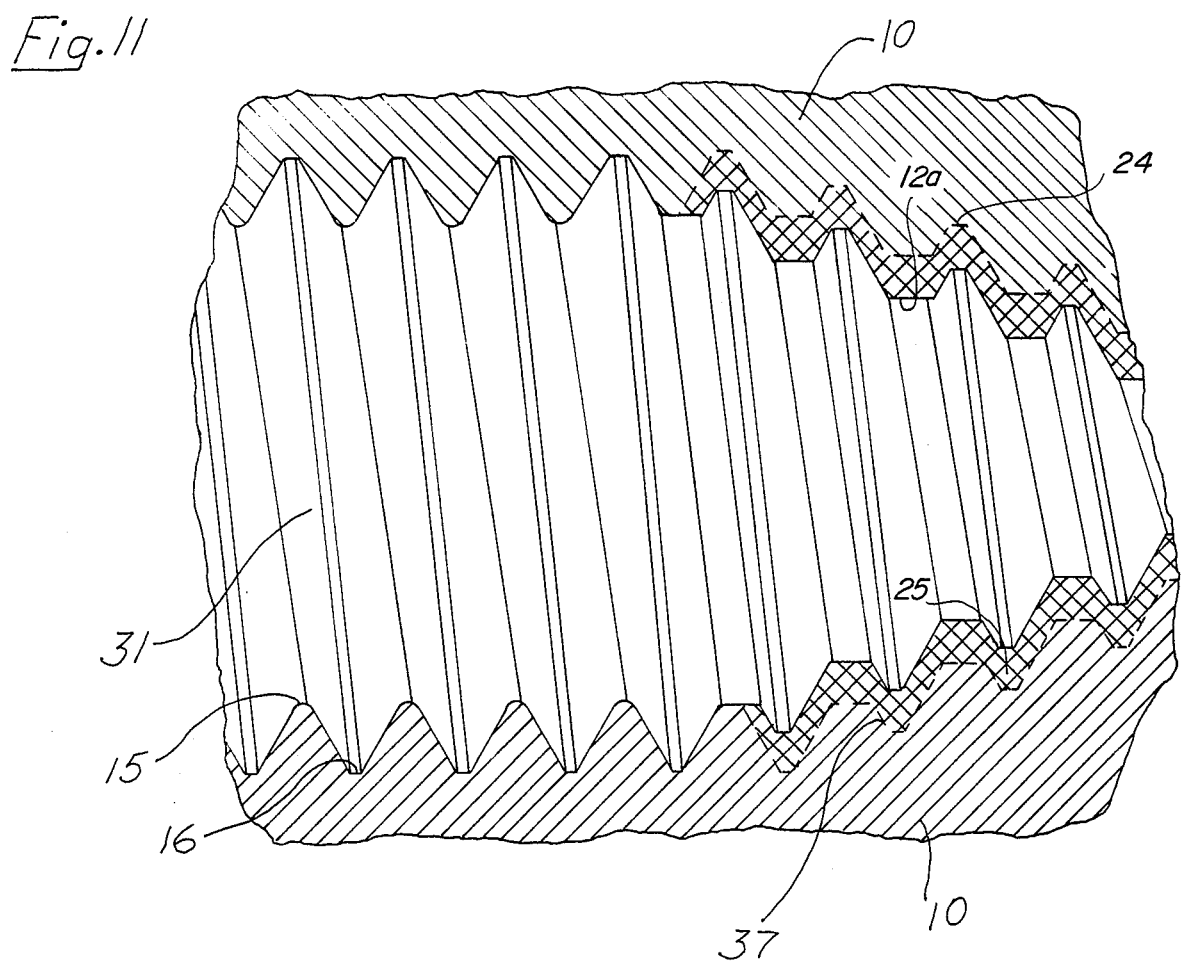
FIG. 11 is a greatly enlarged, cross-sectional, schematic view of the point and adjacent areas of the blank illustrated in the area enveloped by the brokenline oval in FIG. 10.

The contour of the working surface of the disclosed die 10 resulting from the shift of the forward portion 12a of the rise angle surface 12 into the path of a blank effects a relatively early displacement of blank material from the eventual point area of the blank. More specifically, with particular reference to FIGS. 10 and 11, where opposed dies 10 radially constrict a blank 31 it is seen that the die profile at the rise angle surface 12a is displacing material axially into a slug area 32 of the blank. The view of FIGS. 10 and 11 is taken early in the thread rolling sequence where a blank 31 would be approximately at the line 10—10 in FIG. 3. It is seen that the cut-off edges, designated 33, of the opposed dies 10 at this stage of the rolling sequence depicted in FIG. 10 do not greatly restrict axial displacement of blank material into the slug 32. As a consequence, in later stages of the rolling sequence, where the point of the blank 31 rolls up the cut-off edges 33, there is a reduced requirement for axial displacement or flow of blank material from the area of the point. The point of the blank 31 in this later stage of the thread rolling sequence primarily needs only to be finished shaped.

The above-described circumstances can be more completely understood from study of FIG. 11. The shifted forward rise angle is indicated at 12a. Superposed on FIG. 11 is the rise angle plane 24 of the prior art die 21 represented by the phantom threads 37. As has been explained above, the rise angle plane 24 of the prior art die 21 is parallel to the rolling direction. The double cross-hatch area 25 in FIG. 11 represents a measure of the volume of blank material which is displaced early in the thread rolling sequence as compared to the rolling sequence produced by the prior art die 21.

Early displacement of blank material from its point, as accomplished by the disclosed contour of the die 10, affords the benefits of reduced pressures and forces in the blank 31 and die 10. Such reduced pressures make it easier to produce parts within tolerance, reduce wear rates on the die, and reduce the risk of premature failure of the die in the rise angle surface area 12 and in the G-plane area 11 immediately adjacent the rise angle surface 12.

Figure 7:
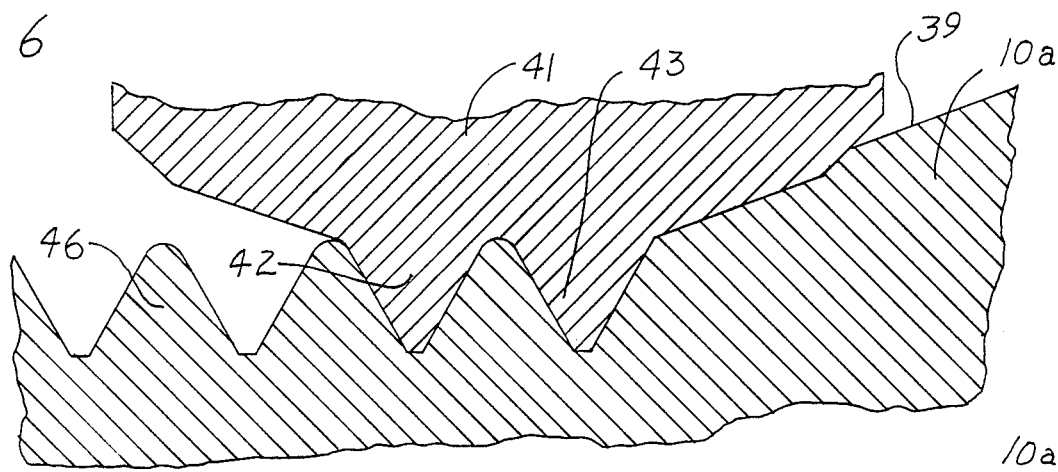
Figure 8:
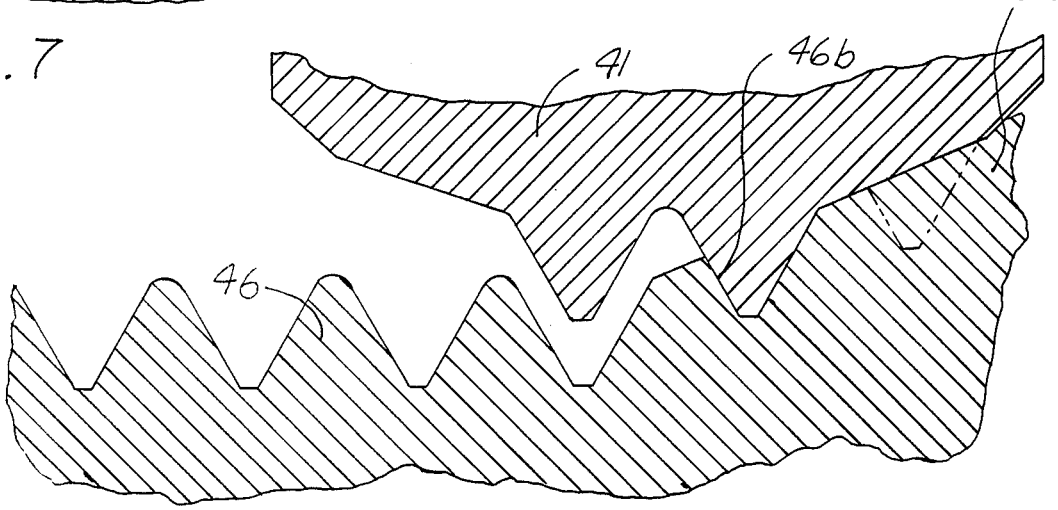

Formation of the G-plane and rise angle surfaces 11, 12 of the die 10 is explained with particular reference to FIGS. 6-8. A die preform 10a is machined or otherwise formed with the general shape of the finished die 10 but with excess stock in the area of the working face. In a simple and economical form, the die preform 10a can be milled or otherwise shaped as a prism such that where the G-plane and rise angle surfaces 11, 12 will be formed there are provided only two outward "rough-cut" planes, one 38 corresponding to the G-plane 11, and the other 39 enveloping both of the forward and rearward rise angle planes 12a and 12b. The rough-cut rise angle plane 39 can, for example, extend approximately parallel to the rearward or finished rise angle plane 12b but be disposed leftwardly as viewed in FIGS. 1, 3 and 6-8 of the extreme forward end of the forward rise angle plane 12a.

The thread ridges 15 and grooves 16 of the die are formed by a tool 41 in the form of a single point milling wheel cutter 41 having axially spaced ribs 42, 43. In FIGS. 6-8, the fragmentary cross section of the periphery of the milling wheel cutter 41 is shown. It will be understood that the wheel cutter, in accordance with conventional practice, rotates about an axis above and parallel to the G-plane and transverse to the lead angle of the die threads formed by the alternating ridges and grooves 15, 16. The cutter wheel 41 also translates relative to the die preform 10a along paths parallel to the lead angle. The wheel cutter 41 is programmed to translate along successive paths, index-spaced a distance equal to the required spacing of the ridges and grooves 15, 16 of the threads 46. It will be seen from FIGS. 6 and 7 that the cutter 41 cuts at a depth sufficient to completely remove the rough-cut G-plane 38.

As indicated in FIGS. 1 and 3, the direction of the threads 46 along the lead angle is oblique to the heel line 17 so that at least some of the individual threads 46 cross both G-plane 11 and rise angle surfaces 12a, 12b. Consequently, the program controlling motion of the wheel cutter 41 includes the imposition of suitable lift (or drop depending on cutting direction) above the G-plane as it passes over and forms the individual rise angle surfaces 12a, 12b. The cutter program can be embodied in a conventional medium such as a three-dimensional cam or a numerical control. In the illustrated case, the cutter elevation above the die preform 10a is controlled so that a point designated generally at 48 on the root area of the profile of the rightward rib 43 of the cutter 41 lies in the planes 12a, 12b of the rise angle surfaces as these planes are being formed.

In accordance with one aspect of the invention, the cutter tool 41 is provided with an integral preliminary die shaping surface 51. This preliminary cutting section 51 is generally conical and has an axial length, measured from the root area 48 of the adjacent cutter rib 43, of preferably the center-to-center distance between the cutter ribs 42, 43. As will be understood by those skilled in the art, the axial spacing between the cutter ribs 42, 43 corresponds to the distance the cutter wheel is indexed between each pass over the working face of the die. The preliminary shaping surface 51 sizes the area of the die preform 10a to be cut during the next pass of the wheel cutter 41, it being understood that the wheel cutter is indexed from left to right in the various figures. Thus, without additional machining, set-up and the like, the cutter wheel ribs 42, 43 are presented with an accurately formed and positioned surface as they progress over the rise angle planes 12a, 12b. This result is highly advantageous since very accurate and repeatable thread profiles, designated 46b, can be produced on the rise angle surfaces 12a, 12b. The risk of insufficient stock being available to completely fill out the crest of the die threads 46 in the rise angle surfaces 12, 12b is avoided by providing a die preform 10a with assuredly adequate, i.e., excess, stock in the rise angle area. Since the preliminary die cutter surface 51 is operative simultaneously with the cutter ribs 42, 43, there is no penalty paid in machine time to pre-size the rise angle area and remove excess stock. FIGS. 6, 7, and 8 illustrate three successive passes of the wheel cutter 41 over the die preform 10a in the transition area of the heel line 17 between the G-plane 11 and rise angle surface 12. In FIG. 7, the wheel cutter 41 is cutting the last thread in the G-plane 11 while the preliminary cutting surface 51 is forming the beginning of the rise angle surface 12. In FIG. 8, the wheel cutter 41 has been lifted away from the G-plane 11 to satisfy the condition that the root area 48 of the adjacent cutter rib 43 lies in the rise angle plane 12. It will be noted that the angle of the conical preliminary cutting surface 51 is substantially identical to the angle that the rise angle surface 12 forms with the G-plane 11.

Figure 9:
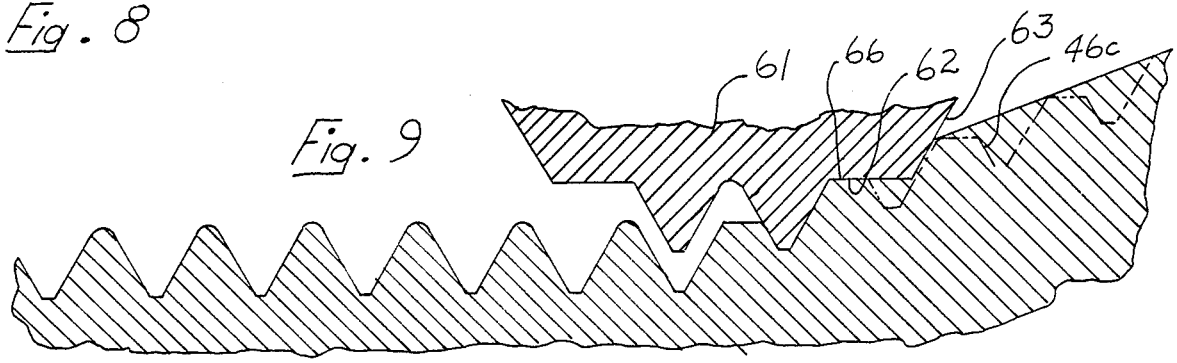
FIG. 9 is a view similar of FIG. 8 but illustrating a second thread cutter style and novel thread profile in the rise angle portion of the die.

In FIG. 9, there is shown a modified form of a wheel cutter where integral, extended cutting surfaces 62, 63 preliminarily face a rise angle surface. The extended surfaces provide a stepped cross section in the cutter wheel extension, including a generally cylindrical portion 62 concentric about the axis of the wheel cutter 61 and an outer conical portion 63, likewise concentric about the cutter wheel axis. The axial length of the cylindrical cutter extension 62 is preferably sufficiently long to at least extend across the upper face of the crest 66 of threads 46c on the rise angle plane, while the conical cutter portion 63 has sufficient axial length when combined with the length of the cylindrical portion 62 to sweep substantially the full area covered by the adjacent cutter rib 43 in the latter's subsequent pass over the die preform. The cutter wheel 61 is operated in essentially the same manner as that described in connection with the wheel cutter 41 of FIGS. 6 through 8. The wheel cutter 61 shown in FIG. 9 produces a modified thread form 46c in the rise angle surface where the crest 66 of the threads in this surface are substantially parallel to the G-plane. The die threads 46c in this area, because of their blunt profile and equal angles on each corner, are relatively strong. Since the crests 66 are flat, the resulting thread depth in the rise angle is less, so that the die is stronger in this area. Another advantage of the die illustrated in FIG. 11 is that the minor diameter of a threaded part made by it will be larger at any given spot on the point than that on a similar part made with a conventional die with angled crests. This effective increase in diameter along the point of a part reduces the tendency of the point to break off during the thread rolling process.

Figure 12:
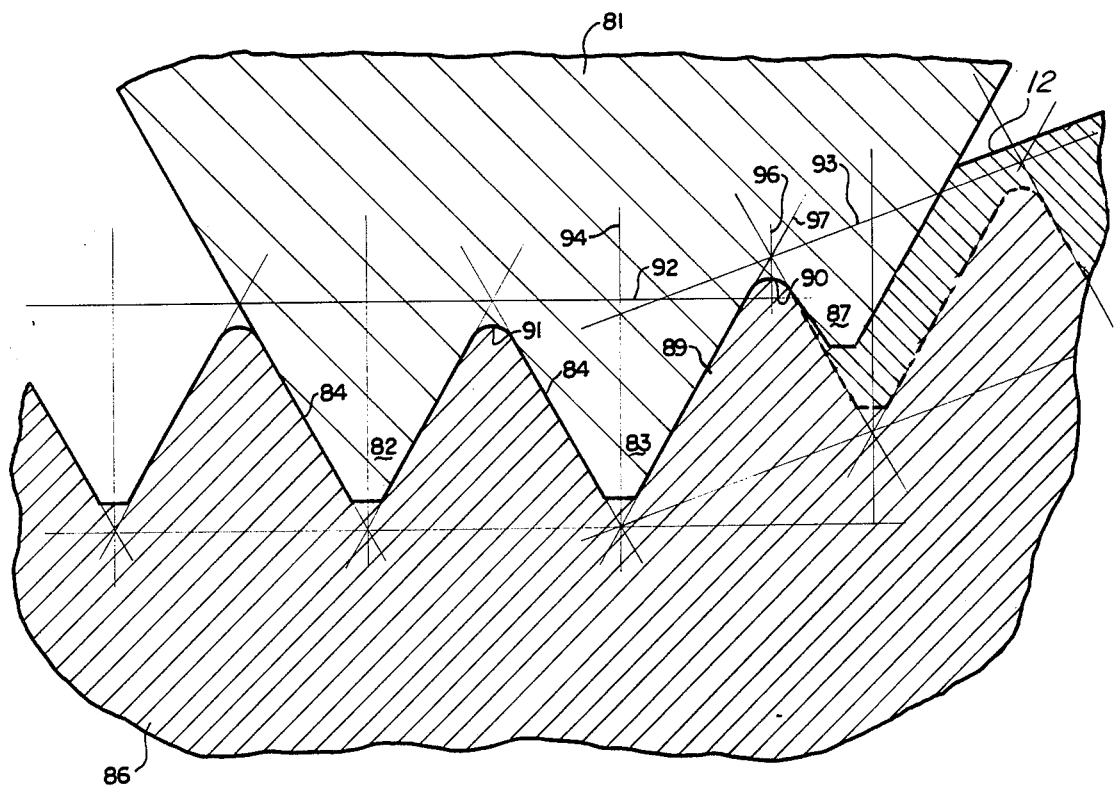
FIG. 12 is a view similar to FIGS. 8 and 9 but illustrating a third thread cutter style operable to cut thread forms on the rise angle surface having rounded crests.

FIG. 12 illustrates a third form of cutter which operates to fully cut the rise angle surface. Such cutter, however, is arranged to produce die thread forms on the rise angle surface having rounded or radiused crests. Such rounded crests, by eliminating sharp corners or edges on the die thread forms, tends to improve die life and provides a screw having radiused roots even in the pointed portion thereof.

In the embodiment of FIG. 12, the wheel cutter 81 is again provided with two cutter ribs 82 and 83 which form the thread forms 84 on the G-surface of the die 86. This cutter, however, provides a lead rib 87 which operates during the cutting of the rise angle surface to form a radiused crest on the thread forms 89 on the rise angle surface. Here again, the full rise angle surface is cut by the cutter, so full accuracy is provided by the cutter itself.

The rib 87 is joined to the rib 83 by a concave radius 90 which is raised with respect to the radius 91 between the two ribs 82 and 83. This radius 90 forms a crest of the threads formed along the rise angle surface and the adjacent rib 83 forms the remainder of such thread forms.

In order to ensure that the crests of the threads on the finished fastener are properly spaced apart by one pitch distance along both the cylindrical portion and point portions, it is necessary to form the roots of the grooves at an equal pitch spacing along both the G-surface and rise angle surface. Therefore, because the flanks of the threads along the rise angle surface have different lengths, the spacing of the thread crests on the rise angle surface must be shifted to the right (as viewed in FIG. 12) from the crests along the G-surface. Further, since the crests along the rise angle surface are formed by the radius 90, it is necessary to shift the horizontal spacing between the centers of curvature of the two radii 90 and 91 from the pitch spacing. Such shift is required by the fact that the rise angle surface is inclined up from the G-surface. The amount of shift required is a function of the angle of the rise angle and also the angle of the thread flanks.

Figure 13:
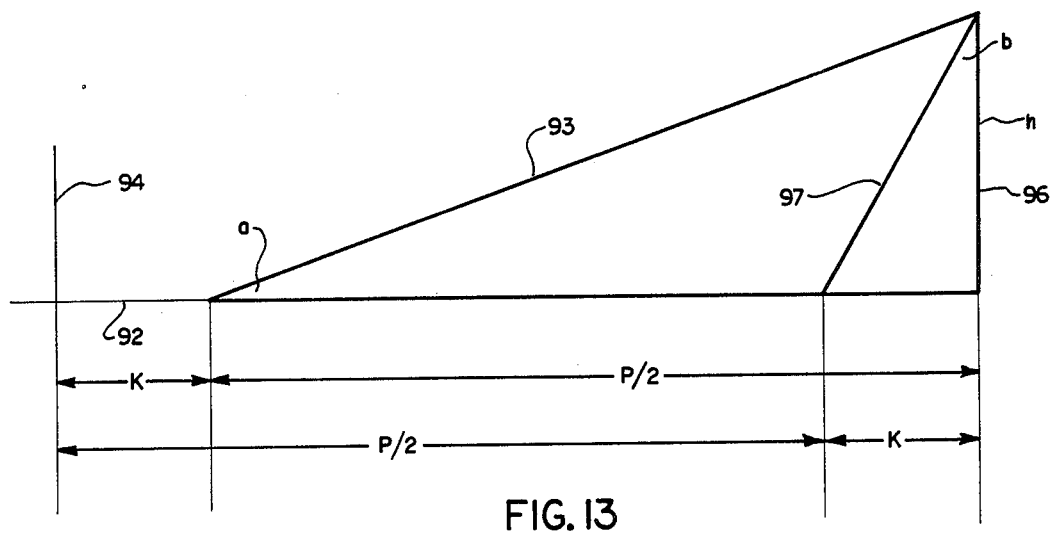
FIG. 13 is a geometric diagram illustrating the manner in which the offset required in the cutter of FIG. 12 is determined.

FIG. 13 is a diagram illustrating the geometry for determining the amount of shift required. The line 92 is the horizontal line connecting the projected intersections of the flank surfaces of the thread forms along the G-surface and the line 93 is the inclined line connecting the projected intersections of the flank surfaces of the thread forms 89 on the rise angle surface. The line 93 forms an angle a with respect to the line 92, which is equal to the angle of the rise angle surface with respect to the G-surface. The line 94 is the centerline of the rib 83, which is also the centerline of the root of the last full depth groove formed along the G-surface. The line 96 is the centerline of the radius 91 which is the centerline of the crest of the first thread form on the rise angle surface. The line 97 is a projection of one flank of the first thread form 89 on the rise angle surface and forms an angle b with respect to the centerline 96.

If it were not for the shift, discussed above, the centerline 96 would be spaced from the centerline 94 by one-half a pitch, or P/2. However, since the shift is required, the centerline 96 is spaced from the centerline 94 by a distance equal to P/2+K.

The height h or length of the line 96 above the line 92 is determined by the equation $$H = (P/2) \tan a$$

where a is the angle between the G-surface and the rise angle surface.

Further, the offset K is determined by the equation $$K = h \tan b$$

Therefore $$K = (P/2) \tan a \tan b$$

Therefore, as an example, when forming a die for a 5/16 inch fastener having an 18 pitch and a 20° rise angle $$(P/2) = \tfrac{1}{2} \times 1/18 \text{ or } 0.027777$$

and $$K = 0.027777 \tan 20° \tan 30°$$

or $$K = 0.005837 \text{ inch.}$$

Therefore, the centerline 96 of the radius 90 in space d from the centerline 94 of the adjacent rib 83 by 0.027777+0.005837 inch, or 0.0336 inch.

Similarly, the spacing between the centerline of the radius 91 and the centerline of the radius 90 is equal to $$P + (P/2) \tan a \tan b$$

and for the example 0.0614 inch.

Normally, the radius of curvature of the radius 90 is equal to the radius of curvature 91, and for the particular screw size set forth above is usually about 0.0070 inch.

If it is desired to provide shallower threads on the point of the screw, a larger radius of curvature may be provided for the radius 90 and it is moved down to blend into the flank of the rib 89. In such instance, the peak of the upper extremity of the radius 90 would be lowered to some extent. This would have the effect of moving the rise angle surface to the right, but would not change the angle thereof.

It should be noted that the spacing between the crest of the thread forms on the rise angle surface is equal to the pitch of the screw, and that the roots are also spaced by a distance equal to the pitch of the screw being formed. However, the centerline of the radius of the crests of the thread forms is offset by the distance K, as discussed above, in each such thread form.

In order to ensure that the rib 87 only forms the crest of the thread form along the rise angle surface, the flank angle of the rib 89 adjacent to the radius 90 is preferably slightly more than 30 degrees, and in the illustrated embodiment is 32 degrees. By forming the flank angle slightly greater than the flank angle of the other ribs, a condition exists in which the sides of the rib 83 form both flanks of the thread forms along the rise angle surface.

The disclosed wheel cutters 41, 61 having their respective axial extensions 51,62,63, and 87 are particularly useful in producing the disclosed workface contour of the die 10 of FIGS. 1 and 3. These extensions 51,62,63 readily remove excess material of the die preform in the heel area or hollow of the rise angle planes resulting from the forward rise angle surface 12a being shifted out of the plane of the rear rise angle surface 12b.

It will also be noted that with each embodiment of the wheel cutter 41,61, the entire rough-cut rise angle surface of a die preform is accurately premachined just prior to cutting of the thread profiles on these rise angle surfaces so that the final thread profiles cannot be influenced by the original configuration of the rough-cut area in the rise angle zone of the die preform. Since the preliminary cutter extensions 41, 61, and 87 have an axial length sufficient to cover the full area cut by the ribs 41, 42 on their subsequent pass, these extensions serve the desirable function of precisely forming the crests of the threads in the rise angle surface. The cutters may be of any suitable tool style, such as a rotary milling cutter, grinding wheel, and the like having a profile complementary to the die threads.

FIGS. 2 and 4 illustrate a modified die 70 with a working face contour which, like that of the embodiment of FIGS. 1 and 3, when compared to the prior art working face contour of the die of FIG. 5, effects displacement of material from the point area of a blank at a relatively early stage in the thread rolling sequence. This modified die 70 has a G-plane 71 and a single rise angle plane 72 which is inclined with respect to the G-plane and intersects it along a straight heel line 73 parallel to the rolling direction or path of a blank. The die 70 is produced by facing its G-plane and its effective rise angle surface with a cutter such as that disclosed in FIGS. 6 through 8 or 9, or a conventional cutter not having a preliminary cutting extension.

In forming threads 76 on the die 70, the motion of the wheel cutter is modified by prematurely withdrawing or raising the cutter wheel in the forward end of the die immediately adjacent and in the rise angle plane 72. More particularly, an imaginary plane analogous to the forward rise angle plane 12a of the die of FIGS. 1 and 3 is assumed to present a barrier or reference plane. This imaginary reference plane has essentially the same inclination to the G-plane 71 as the real rise angle plane 72, intersects the real rise angle plane at a line 77, and intersects the G-plane along an imaginary heel line 78. The cutter produces the die of FIGS. 2 and 4 by a cutting program which regards the described imaginary plane as real, so that in the forward portion of the die 70, both in the G-plane 71 rightward of the imaginary heel line 78 and in the real rise angle plane, the depth of the grooves of the threads 76 is relatively shallow. The shallow grooves in this zone afford a reduced volume or clearance for material in the point area of a blank being rolled by the die 70 so that early in the thread rolling sequence, excess material in the area of the blank to be pointed is displaced axially into the slug.

Although the preferred embodiments of this invention have been shown and described, it should be understood that various modifications and rearrangements of the elements and steps may be resorted to without departing from the scope of the invention as disclosed and claimed herein. While the disclosed dies are of the self-pointing type, it will be understood that the principles of the invention are applicable to other types of dies which have a rise angle surface or like structure but are not used to originally form a point (where the blank is pointed before it is introduced to the dies) and/or to cut off a slug. Examples of other types of dies with which the invention may be employed are those used to manufacture fasteners commercially known as type F and those marketed under the registered trademark SWAGEFORM.

What is claimed is:

1. A method of forming a thread rolling die for fasteners and the like having cylindrical bodies and pointed ends, comprising the steps of forming a die block with a generally planar first surface corresponding to the cylindrical main body of the fastener and a second surface generally corresponding to the point of the fastener, and cutting threads across both of said surfaces, the threads on at least said second surface being cut during a plurality of separate machine passes of cutter means over said surface, the cutter means being arranged to remove sufficient material from the die block to form substantially the entire profile of the threads on said second surface whereby inaccuracies in the form of such threads on the second surface related to the original contour of the die block preform are substantially avoided.

2. A method as set forth in claim 1, wherein said first and second surfaces are formed to intersect at a heel line and said threads are cut along lines oriented relative to said heel line at an angle generally equal to the lead angle of the threads formed on elements worked by said die.

3. A method as set forth in claim 1, wherein said cutter means is provided with a preliminary cutter extension, the preliminary cutter extension being arranged to presurface an area parallel to the area being simultaneously formed with a thread by said cutter means in a machine pass and corresponding to the area formed with a thread during the next succeeding machine pass of the cutter means.

4. A method as set forth in claim 3, wherein the cutter means preliminary extension is proportioned to surface an area at least corresponding in width to the center-to-center spacing between adjacent threads being formed on said die.

5. A method as set forth in claim 1, wherein said cutter means operates to form the crests of said threads along said second surface during one pass of said cutter means and forms at least one flank and the root of said threads along said second surface during another pass of said cutter means.

6. A method as set forth in claim 5, wherein said cutter means operates to form radiused crests on the threads on said second surface.

7. A method as set forth in claim 6, wherein said crests of said threads on said second surface are formed offset from the crests of said threads of said first surface by a distance different from the pitch spacing of said threads.

8. A method as set forth in claim 7, wherein the amount of said offset is equal to $$P/2 \tan a \tan b$$

where P is the pitch of a fastener to be threaded, a is the angle of rise angle surface and b is the flank angle of the thread forms on the dies.

9. A method of forming a thread rolling die for fasteners and the like having cylindrical bodies and pointed ends comprising the steps of forming a die block with a generally planar first surface corresponding to the cylindrical main body of the fastener and a second surface generally corresponding to the point of the fastener, and cutting threads across both of said surfaces with a rotary cutter rotating about an axis generally parallel to said first plane and transverse to said threads, the threads on at least said second surface being individually cut during a plurality of separate machine passes of the rotary cutter over said surface, the rotary cutter being arranged to remove sufficient material from the die block preform to form substantially the entire profile of the threads on said second surface whereby inaccuracies in the form of such threads on the second surface related to the original contour of the die preform are substantially avoided, the rotary cutter being provided with an axially extending preliminary cutter having sufficient axial length and a suitable diameter to face the crest of the next adjacent thread to be formed on said second surface by said rotary cutter.

10. A method as set forth in claim 9, wherein said preliminary cutter is radiused to form a radius on the crests of said threads on said second surface.

11. A method as set forth in claim 9, wherein the preliminary cutter is provided with a generally constant diameter in its crest forming zone whereby such zone is generally cylindrical.

12. A method as set forth in claim 9, wherein the preliminary cutter is provided with a generally decreasing diameter in its crest forming zone in a direction away from the thread cutting zone whereby such crest forming zone is generally conical and is adapted to form a crest surface parallel to said second surface.

13. A method of forming a thread rolling die for fasteners and the like having cylindrical bodies and pointed ends, comprising the steps of forming a die block with a generally planar first surface corresponding to the cylindrical main body of the fastener and a second surface generally corresponding to the point of the fastener, and cutting threads across both of said surfaces, the threads on at least said second surface being cut during a plurality of separate machine passes of cutter means over said second surface, the cutter means being programmed to contour the first and second surfaces in an area adjacent their intersection at the forward end of the die with a profile that corresponds to a reduced volume of blank stock in its point and adjacent sections of the cylindrical main body as compared to the corresponding profile at the finish end of the die whereby displacement of blank material from its point area is accomplished at a relatively early stage in the thread rolling process and thread rolling pressures are reduced.

* * * * *